Dec. 13, 1960   P. E. OHMART   2,964,628
RADIATION SOURCE FOR DENSITY RESPONSIVE APPARATUS
Original Filed Oct. 13, 1953   2 Sheets-Sheet 1
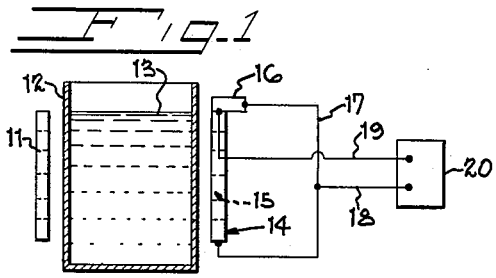
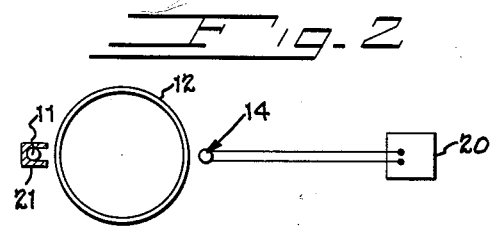
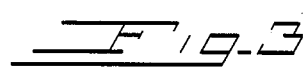
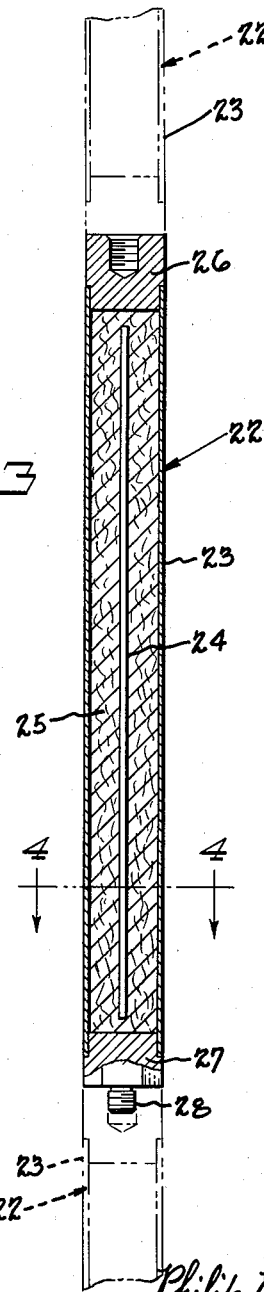
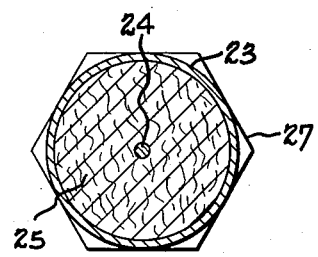
INVENTOR.
Philip E. Ohmart.
BY
Wood, Herron & Evans.
ATTORNEYS.

Dec. 13, 1960 P. E. OHMART 2,964,628
RADIATION SOURCE FOR DENSITY RESPONSIVE APPARATUS
Original Filed Oct. 13, 1953 2 Sheets-Sheet 2

INVENTOR.
Philip E. Ohmart.
BY
Wood, Herron & Evans
ATTORNEYS.

United States Patent Office 2,964,628
Patented Dec. 13, 1960

2,964,628

RADIATION SOURCE FOR DENSITY RESPONSIVE APPARATUS

Philip E. Ohmart, Cincinnati, Ohio, assignor to The Ohmart Corporation, Cincinnati, Ohio, a corporation of Ohio Original application Oct. 13, 1953, Ser. No. 385,753, now Patent No. 2,737,592, dated Mar. 6, 1956. Divided and this application Feb. 1, 1956, Ser. No. 562,899

2 Claims. (Cl. 250—43.5)

This invention relates to apparatus for measuring or controlling the density, or level, of liquids or other fluent materials, and is particularly directed to apparatus of this type employing an elongated strip of radioactive material and a radiation responsive element such as a radiant energy electric generator, ionization chamber, Geiger counter, scintillation counter, or the like.

The principal object of the present invention is to provide apparatus for accurately measuring or controlling the height of a liquid or the interface between two immiscible liquids within a container throughout a substantial fraction of the height of the container. A further object of the present invention is to provide apparatus of this type in which the signal developed for operating the control or indicating device varies linearly with changes in liquid level throughout the whole range of measurements. Hence, once the indicating apparatus has been calibrated at two levels, the remaining readings on the indicator will automatically correspond to the intermediate values of liquid level.

One preferred embodiment of apparatus constructed in accordance with the principles of the present invention is shown in my copending application for "Density Responsive Apparatus," Serial No. 385,753, filed October 13, 1953, now Patent No. 2,737,592, the present application being a division of that application. The present application is primarily directed to the strip radioactive source described in that application. A liquid level control or measuring device utilizing the present source comprises a substantially continuous strip source of radioactivity and an elongated radiation detector, such as a radiant energy electric generator, ionization chamber, Geiger counter, or scintillation counter. The "strip source" and "strip detector" are disposed relative to a column of liquid or other fluid material so that radiations emitted by the source pass through the liquid and impinge upon the detector. The detector produces an output signal, in the form of a current flow or a plurality of pulses, which is correlated with the amount of radiation striking the detector. This signal is either applied to a suitable indicator or control mechanism.

The present invention is predicated upon the empirical discovery and determination that a liquid level apparatus so constructed is effective to generate an output signal for operating a measuring or control device which signal varies in a linear fashion with changes of liquid level throughout a range of liquid levels extending substantially from the bottom of the elongated detector to its top. Consequently, apparatus of this invention is effective to provide accurate measurement or control over extremely wide ranges of liquid level with an absolute minimum of calibration.

The present invention is also directed to the construction of a strip source of radioactive radiation. This source, when assembled, provides a substantially continuous elongated emitter, in which radioactive material is uniformly distributed from one end to the other. More specifically, a preferred embodiment of strip source comprises a plurality of component sources, each of which includes an elongated housing encasing an elongated radioactive element extending from one end of the housing to the other end. The radioactive element is preferably in the form of a coated wire or strip disposed axially of the casing and held in place by means of structural supports or inert packing material to prevent its accidental displacement. The component source also includes coupling members, disposed at the ends of the housing, the coupling members being effective to facilitate the securance of a plurality of component sources in endwise abutment.

Another object of the present invention is to provide a means for increasing the magnitude of the signal corresponding to a given increase in liquid level. This object is accomplished by providing means in association with either the source or the detector for collimating the radiant beam impinging upon the detector. In other words, I have found that by collimating the radiations so that only those radiations traveling directly from the source to the detector impinge upon the detector, the rate of change of signal output for a given change in liquid level is greatly increased.

These and other objects and advantages of the present invention will be more readily apparent from a further consideration of the following detailed description of the drawings illustrating a preferred embodiment of the invention.

In the drawings:

Figure 1 is a diagrammatic elevational view of a strip source and strip detector, showing the manner in which they are employed as component parts of a liquid level measuring or control device.

Figure 2 is a diagrammatic top plan view of a slightly modified form of the apparatus shown in Figure 1.

Figure 3 is an enlarged cross sectional view of one of the component source holders forming the strip source.

Figure 4 is a cross sectional view taken along line 4—4 of Figure 3.

Figure 5:
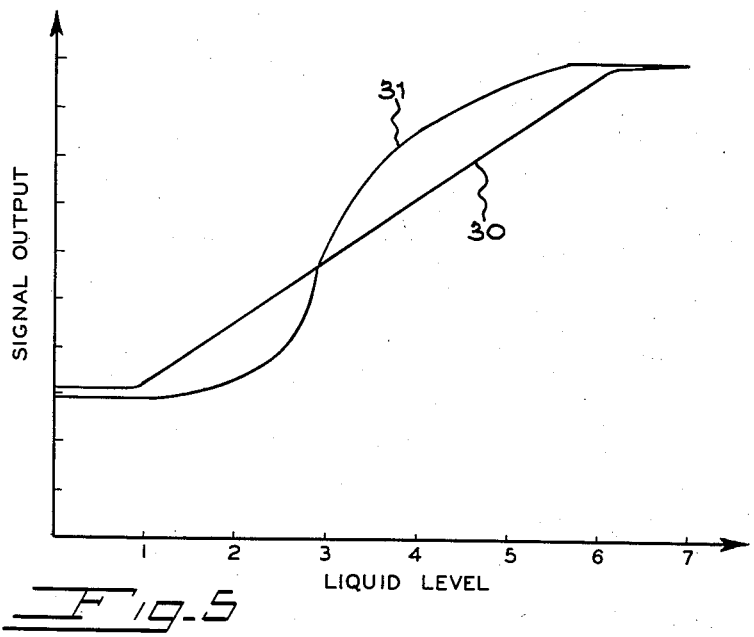
Figure 5 is a graph showing the manner in which the signal output of an elongated detector varies in accordance with the height of a liquid, when a point source and a strip source activity are employed.

As shown in Figure 1, one form of liquid level apparatus constructed in accordance with the present invention comprises a strip source of radioactive material 11 disposed on one side of a container 12, filled with a liquid 13. A strip detector 14 is disposed on the opposite side of the container from the radioactive material. Consequently, radiations emitted by source 11 pass through the walls of container 12, through any liquid interposed between the source and the detector, and finally impinge upon detector 14.

As described and claimed in my copending application, one suitable form of detector comprises a plurality of longitudinal aligned Ohmart cells, or radiant energy electric generators 15, in parallel electrical connection, together with a compensating cell 16. The details of an Ohmart cell construction are disclosed and claimed in Patent No. 2,737,592. It will suffice here to state that essentially an Ohmart cell comprises three elements: a first electrode, a second electrode electrochemically dissimilar from the first, and electrically insulated from it, and an ionizable gas in contact with the two. Due to the chemical asymmetry of the electrodes, a field bias is created between them. When the gas within the cell is ionized by the impingement of ionizing radiation, or by secondary radiation, in turn caused by the ionizing energy, there will be a discriminatory migration of the ions toward the electrodes. The positive ions will move toward the more noble electrode, and the negatively charged electrons will move toward the more active electrode. These particles will collect on the respective electrodes, causing a potential difference to be built up between them. One terminal electrode of the "strip" Ohmart cell and the terminal of opposite polarity of the compensating cell are respectively joned together through lead 17 and are connected to a measuring or control device 20 by means of lead 18. The other terminal electrode of the strip cell and the second electrode of the compensating cell are connected to the measuring or control device through lead 19.

As explained in my copending application, the combination strip cell and compensating cell are effective to generate a current the magnitude of which varies with the density of the impinging radiant energy.

It will be understood, however, that a strip source of radioactive material may be advantageously used in conjunction with other detectors, such as an elongated ionization chamber, a Geiger counter, or a scintillation counter. Those skilled in the art will readily appreciate that in an installation employing an ionization chamber, a source of constant potential is connected to one electrode of the ionization chamber. The current flowing through the chamber varies with the amount of radiation impinging upon the chamber, and is measured to provide an indication of liquid level. In an installation using a Geiger counter, a high acceleration potential is applied across the electrodes of the counter which is then effective to produce an output signal in the form of a plurality of pulses, the frequency of which is correlated with the intensity of the impinging radiation. Similarly, a scintillation counter is effective to produce a plurality of current pulses, the frequency of which is dependent upon the intensity of the radiation impinging upon the counter. Many suitable forms of devices are known in the art for transforming these pulses to an indication of liquid level.

Depending upon the particular type of detector employed, device 20 is responsive either to the current output of the detector or to the frequency of the pulses produced by the counter. This device may include means, such as a dial or recording instrument, for indicating the liquid level. Alternately, device 20 may include means responsive to the output signal of the detector effective to actuate suitable apparatus, such as electric solenoid valves for maintaining the liquid within the container at a predetermined level. If desired, device 20 can perform two or more of these functions simultaneously; that is, for example, it can both control the height of the liquid column and simultaneously provide a visual indication of its level.

It will be understood the exact construction of the radiant energy detector constitutes no part of the present invention. A preferred form of detector employing Ohmart cells is described in detail in my above identified copending application. Those skilled in the art will readily appreciate the manner in which other suitable forms of detectors, such as ionization chambers and the like, can be constructed and connected to suitable measuring and control circuits.

The details of a preferred embodiment of a strip source are given below. It will suffice here to state that the strip source limits radiation over a substantial height, and is disposed vertically adjacent to the wall of a container; while the strip detector is disposed vertically adjacent to a wall of the container at a point spaced from the detector so that the radiations emitted from the source pass through the liquid or other material within the container before impinging upon the detector. Depending upon various factors, such as the type of radiation employed, the density of the material being measured, the thickness of the container walls, et cetera, it may be preferable in some installations to shift the relative position of the detector and the strip source so that they lie along the extension of a chordal line rather than a diametrical line, as shown. In some cases, it may even be desirable to mount the radioactive material within the container. No matter how the strip detector and strip source are arranged relative to the wall of the container, they are preferably at substantially the same height as one another and extend for a distance corresponding to or slightly in excess of the range of liquid levels to be measured.

It is to be understood that a strip detector and strip source arranged as described can be employed for the measurement or control of the level of the interface between two immiscible liquids, or alternatively, the apparatus can be employed to determine or control the slurry level between a solid material and a liquid floating above it. Furthermore, if the container is filled with a substantially homogeneous material, the density of this material can be determined by means of the same apparatus and by connecting device 20 to suitable valves, burners or other elements, the material density can be controlled as readily as liquid level.

Figure 2 is a diagrammatic plan view of a slightly modified form of the apparatus shown in Figure 1. As shown in Figure 2, the radioactive source 11 is provided with a substantially U-shaped collimating shield 21 formed of a relatively impermeable material such as lead, which is effective to collimate the radiations emitted from source 11 and direct them in a narrow beam through the container and liquid onto the strip detector 14. The advantages obtained from the use of such a collimating shield are explained in detail below.

A preferred form of strip source is shown in Figures 3 and 4 and includes a plurality of component sources 22. Each component source comprising a housing in the form of a cylindrical tube 23 constituted of brass or of some other radiation permeable material. Mounted longitudinally within the housing 23 is a strip of radioactive material 24, the strip extending within the housing, preferably along the housing axis for substantially the entire length of the housing. The radioactive material in this embodiment may be in the form of a cobalt wire or a strip of radium coated foil. As shown, the radioactive material is constituted by a thin cobalt wire which is packed in an inert material 25, such as "Fiberfax." The ends of the tubing are enclosed by plugs 26 and 27, soldered to the ends of the tube to form an airtight enclosure. Plug 26 is threaded to form a female coupling, while plug 27 is provided with a threaded extension 28 to form a male coupling. To assemble two or more component strip sources, the housings are aligned longitudinally and the male coupling of one housing is threaded into the female coupling of the adjacent housing. To facilitate this operation, the portion of the plugs extending beyond the tubing is preferably of a polygonal configuration, as best shown in Figure 4. When several of these individual strip sources are assembled the complete strip source contains radioactive material uniformly distributed for approximately the entire length of the strip.

While this preferred embodiment of radioactive source is highly advantageous in that it is easily manufactured, shipped and installed, various modifications of the strip source will readily suggest themselves to those skilled in the art. For example, the component housing 23 may be filled with a mixture of radioactive powder, such as cesium 137, and an inert granular material. Furthermore, threaded male and female couplings 26 and 27 can be eliminated and an additional outer cylinder provided within which the component source housings 23 are stacked in endwise relationship. Also it is contemplated that a single elongated source, formed in any of the manners suggested for the smaller compensating sources, can be used.

In order to facilitate an understanding of the present invention, a brief description will be given of the manner in which a measuring device such as that shown in Figures 1 and 2 is set up and operated. When installing the apparatus, a suitable number of component radioactive strip sources are joined together, as explained above, or alternatively a single radioactive strip source is provided so that the total length of either strip source is substantially equal to or slightly greater than the range of liquid levels to be measured. The source is mounted vertically adjacent to a wall of the container. A suitable detector of substantially the same length as the strip source is mounted adjacent to the liquid container at a point remote from the strip source, so that radiation emitted from the source passes through the container and liquid before impinging upon the detector. Both the radioactive source and the detector are aligned so that their upper ends correspond approximately to the highest level to be measured and their lower ends correspond approximately to the lowermost level to be measured.

After the terminals of the detector have been connected to a suitable measuring or control circuit, the apparatus is ready for calibration. When calibrating a liquid level measuring device of the type shown in Figures 1 and 2, the tank is preferably completely drained, or at any rate drained below the lowest level to be measured. If a strip Ohmart cell and a compensating cell of the type shown in my above identified copending case are employed, the position of the radioactive material in the compensating cell is adjusted so that the current output of the strip cell and the compensating cell is zero. The indicator dial should then read zero, it being understood that the indicator is preferably provided with a linear scale, reading directly in feet of other units of liquid height. If a detector other than an Ohmart cell is employed, suitable adjustments are made in the indicator, depending upon the type of output signal developed, so that the indicator reads zero or some other preselected value. Next, the container is completely filled with liquid and the sensitivity of the apparatus is adjusted until the indicator reads the maximum height. This can be accomplished in any convenient way; for example, if Ohmart cells are employed, by adjusting the value of the impedance to which the net current output of the cells is applied, or by adjusting the amplification factor of an amplifier incorporated into the indicating mechanism, or by adjusting the voltage sensitivity of the indicating mechanism. Those skilled in the art will readily understand the corresponding adjustments which can be made in apparatus used in other types of detectors. So long as the output signal of the detector varies linearly with the amount of radiation impinging upon the detector, then each detector reading intermediate the minimum and maximum readings automatically correspond to the height of the liquid within the container, and no calibration is required at any of the intermediate liquid levels.

The manner in which the net signal output of a detector varies with changes in liquid levels is shown in Figure 5. As there shown, curve 30 represents the relationship between the net signal output of a detector when used in conjunction with the strip source of radiation.

The data for this particular graph was obtained by using as a detector a strip Ohmart cell and compensating cell to measure the height of a liquid column within a container in a manner generally similar to that described in detail in my copending application. However, the signal output of an ionization chamber, Geiger counter or scintillation counter would yield a similar graph. It would be noted that the signal output of the cells remained substantially constant until the container was approximately 15% full. Since with this apparatus the ordinate scale of the graph shows a signal increase when the output of the compensating cell predominates over the strip cell, this shows that the current generated by the strip cell remained substantially constant even though liquid was interposed between a portion of the strip cell and source. This apparently paradoxical behavior can be explained by the fact that a greater quantity of radiation was back-scattered by the rising liquid than was absorbed by it, so that the total quantity of radiation impinging upon the strip cell was not decreased. However, as the liquid level continued to rise, more of the radiation emitted by the source was absorbed, and consequently, the amount impinging upon the strip cell decreased. Thus the current output of that cell decreased, and the net current output of the strip cell and compensating cell increased rapidly. This increase continued until the container was approximately 92% filled with liquid, at which time the net output signal leveled off indicating an increase in backscattered radiation impinging upon the strip cell.

Figure 31 shows the relationship between the net current output of a strip cell and compensating cell when the strip cell is used in conjunction with a point source of radiation.

From the graph shown, it is apparent that the current output of the Ohmart cell with a point source is not linear except over very small ranges of liquid level. Thus in order to provide an accurate indication of liquid level at all heights, the indicator must be calibrated level by level. Furthermore, since the signal output does not change appreciably for liquid level variations of from 0–20% full and from 80–100% full, even a specially calibrated instrument cannot be used to index the liquid level height over a range of approximately 40% of the total liquid level variation.

It is apparent from Figure 5 that although the maximum signal difference is substantially the same when a strip source and a point source are used; nevertheless, with a strip source, the signal output of the cell furnishes an accurate index of liquid level throughout a range extending from a level corresponding to 15% full to a level corresponding to 92% full. This represents approximately 77% of the total liquid height and consequently the strip source furnishes an index of the liquid height over a range substantially greater than that of a device operated in conjunction with a point source. Furthermore, it is apparent that throughout this entire range, the current output of the cell varies linearly with the height of the liquid column. The advantage of this is that the instrument does not need to be specially calibrated once the maximum and minimum points are established.

While the use of a point source substantially limits the range of liquid levels which can be measured by a strip detector, its use may be preferable where measurements are only desired over a very narrow range, or where a cutoff device is to be operated when the liquid reaches a predetermined level. The reason for this is that with a point source the net signal output of a strip detector, over certain ranges of liquid levels, increases much more rapidly with increases in liquid level than is the case when a strip source is used. This greater increase in signal for a given increment of liquid level facilitates obtaining precise measurement and accurate control.

The function of the collimator shown in Figure 2 is to give to a liquid level measuring apparatus the most desirable characteristics of both a strip source and a point source. The collimator, when placed adjacent to the strip source, causes the radiation to be directed through the liquid in a narrow, sharply defined beam; and when associated with a strip detector, it absorbs substantially all of the radiation directed toward the detector except that which is traveling directly from the source. In either case, the collimator is effective to reduce the quantity of backscattered, or reflected, radiation impinging upon the detector. Consequently, when a collimator is used with a strip source, the range of liquid levels over which a linear output signal is obtained is still as wide as that attained from the use of a strip source alone, and the rate of signal increase for a given change in liquid level approaches that from the use of a point source.

Figure 6:
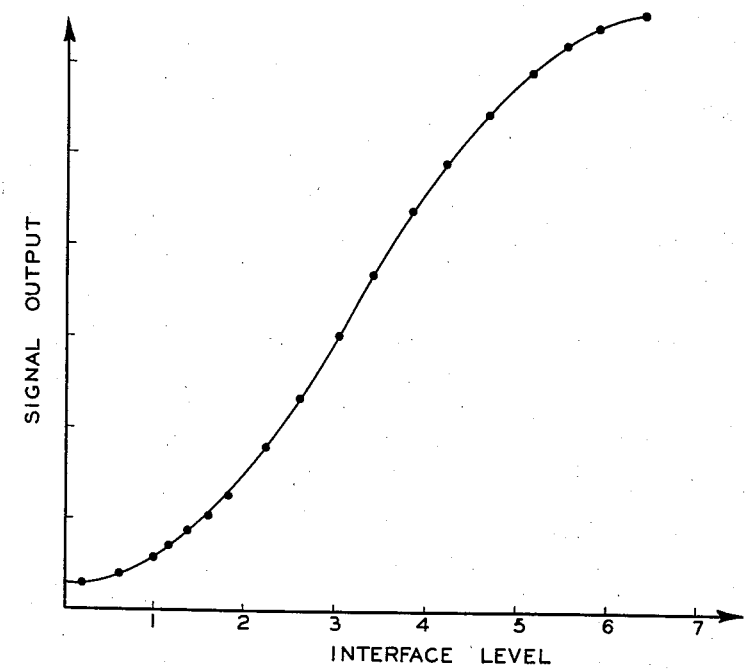
Figure 6 is a graph showing the manner in which the signal output of the detector varies with changes in the height of the interface between two immiscible liquids.

Figure 6 is a graph showing the relationship between the net signal output of a strip detector and the height of a liquid interface existing between two layers of immiscible liquids. It can be seen that the signal variations are almost identical with that occurring in straight liquid level measurement as shown in Figure 5, the signal providing an accurate index of the interface height over a range of approximately 85% of the maximum interface height.

If the container is filled with a substantially homogeneous material such as a liquid or granular material, a strip source of radioactive material and a strip detector can be arranged in the same manner shown in Figures 1 and 2 to measure or control the density of the material. With the apparatus set up in this manner, the net signal output of the strip detector will vary in a linear manner with variations in the density of the material. These variations in the net signal output can be employed to operate a suitable indicating device or, if desired, can be used to control one or more devices such as valves, heaters, or the like, which are in turn effective to control the density of the material in the container.

Having described my invention, I claim:

1. In apparatus for measuring the level of material in a container, the apparatus being of the type including an elongated radiation responsive detector disposed adjacent to the container, the improvement which comprises an elongated source of radioactive material adapted to be mounted in spaced horizontal alignment with said elongated detector, said elongated source of radioactive material comprising an elongated housing formed of radiation permeable material and a quantity of radioactive material disposed longitudinally within said housing, said radioactive material extending substantially throughout the length of the housing and being substantially uniformly distributed throughout the length of the housing, said elongated housing being of substantially the same length as said elongated radiation responsive detector.

2. In apparatus for measuring the level of material in a container, the apparatus being of the type including an elongated radiation responsive detector disposed adjacent to the container, the improvement which comprises an elongated source of radioactive material adapted to be mounted in spaced horizontal alignment with said elongated detector, said elongated source of radioactive material comprising an elongated housing formed of radiation permeable material, said housing being of substantially the same length as said elongated detector, an elongated rod formed of radioactive material extending axially of the housing substantially the length thereof, said rod providing a substantially uniformly distributed source of radiation throughout the length of said housing, and inert packing material mounted within said housing surrounding said rod and adapted to hold said rod in place.

References Cited in the file of this patent

UNITED STATES PATENTS

| | | |
|---|---|---|
| 2,479,882 | Wallhousen et al. | Aug. 23, 1949 |
| 2,516,261 | Schutt | July 25, 1950 |
| 2,559,793 | Pregel | July 10, 1951 |
| 2,592,115 | Carroll | Apr. 8, 1952 |
| 2,674,695 | Grace | Apr. 6, 1954 |
| 2,737,592 | Ohmart | Mar. 6, 1956 |
| 2,765,410 | Herzog | Oct. 2, 1956 |

OTHER REFERENCES

Advertisement of Radium Emanation Corporation, in Annals of Surgery, November 1948; page 4.